E. H. Ashcroft,
Globe Valve,
Nº 60,816. Patented Jan. 1, 1867.
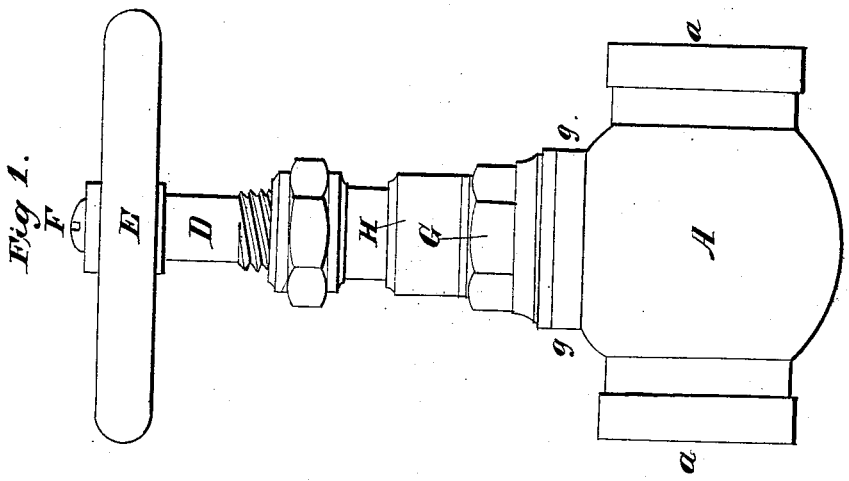
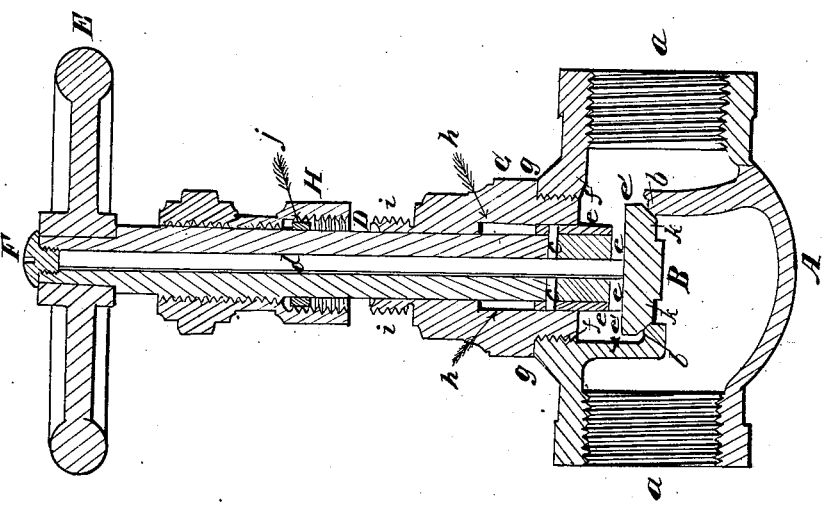

United States Patent Office.

E. H. ASHCROFT, OF LYNN, MASSACHUSETTS.

*Letters Patent No. 60,816, dated January 1, 1867.*

---

IMPROVEMENT IN GLOBE VALVES FOR STEAM ENGINES.

---

*The Schedule referred to in these Letters Patent and making part of the same.*

---

TO ALL WHOM IT MAY CONCERN:

Be it known that I, E. H. ASHCROFT, of the city of Lynn, county of Essex, in the State of Massachusetts, have invented a new and improved Globe Valve for Steam Boilers, or other purposes; and I do hereby declare that the following is a full and exact description thereof, reference being had to the accompanying drawing, and to the letters of reference marked thereon, making part of this specification, and in the figures, of which like parts are represented or indicated by like letters.

The nature of my invention consists in so constructing my globe valve that the valve proper, or its seat, can be gound without disturbing the connections thereof.

To enable others skilled in the art to make and use my invention, I will proceed to describe it. It is well known to all such that the valve or its seat, or both, will wear or become defective by use, when used in connection with steam or water; and with the former, particularly and more especially in marine engines, (ocean steamers, &c.,) it is of great importance to be able to make repairs without even the least stoppage. My invention remedies stoppages under any ordinary if not all circumstances, at least to the extent of not disturbing the connections of the valve. The convenience as well as economy of such arrangement must readily be understood. In the drawings—

Figure 1 represents an elevation of my improved valve; and

Figure 2, a central section through handle, &c.

A represents the body of an ordinary globe valve, the pipes or connections being screwed into the two ends, $a\,a$. B is the ordinary valve proper, and $b$ its seat. This valve, B, has a projection, $c$, of a hollow cylindrical form; and into it is secured by pin C the stem D, to which is secured, at its outer end, the wheel or handle E. The stem D, however, may be so constructed as to be cast with the valve, still forming the offset which is shown by $c$. It will be observed that the central valve-stem D is hollow (see $d$) as far down as the valve-disk; then there is another hole, $e$, through $c$ and stem D, opening on two sides, upon top or outer surface of valve B. This hole is closed at its outer end by a screw, F, which also serves to secure the wheel or handle to the stem. G is a nut screwed into A at $ff$ after the valve and stem are put in the opening $g\,g$. The recess $h\,h$ in this nut limits the opening of the valve. The top or outer end of this nut has a screw-thread, $i\,i$, cut upon it; above, there is still another nut or stuffing-box, H, containing a washer, $j$. In fig. 2 this is shown raised, when the stem and valve are more free to be rotated by the wheel handle.

The operation is simply as follows: Should there be a leak in the valve proper, all that is necessary will be, after screwing down the valve, unscrew the outer plug-screw F, and fill up the inside $d$ of stem D with sand or any other desirable suitable material, which will emerge from the lateral holes $e$, fall upon top of valve, and work over its outer edges, $e'$, and fall upon the seat or joint $k$. By a little turning of the stem this joint can soon be ground so as to make a close one, or a tight seat, and prevent leakage. As soon as the charge is put into the opening of central tube, the screw at outer end is replaced. It will thus be seen how a valve can be refitted without disturbing connections or weakening the globe. The valve may be ground whilst the top nut or stuffing-box H is screwed down; but it can better be done when in a raised position.

Having thus described my invention, what I claim as new, and desire to secure by Letters Patent of the United States, is—

1. The hollow valve-stem D, constructed in the manner substantially as described and for the purpose set forth.

2. The combination of the said stem with the globe-valve B and screw-nut F.

E. H. ASHCROFT.

Witnesses:
   HENRY A. CHURCH,
   JACOB W. PINER.